United States Patent [19]
Steiner et al.

[11] 3,757,885
[45] Sept. 11, 1973

[54] STEERING SPINDLE FOR MOTOR VEHICLES, ESPECIALLY FOR COMMERCIAL-TYPE VEHICLES

[75] Inventors: Adolf Steiner, Gerlingen; Hans Rinnergschwentner, Rotenfels, both of Germany

[73] Assignee: Daimler-Benz Aktiengesellschaft, Stuttgart-Unterturkheim, Germany

[22] Filed: Jan. 20, 1971

[21] Appl. No.: 107,937

[30] Foreign Application Priority Data
Jan. 21, 1970 Germany............... P 20 02 471.9

[52] U.S. Cl. .......................... 180/89 A, 296/28 C
[51] Int. Cl. ............................................. B62d 1/18
[58] Field of Search.............. 280/87 A; 296/28 C, 296/35 R; 180/89, 89 A; 74/493; 287/53 SS, 58 CT

[56] References Cited
UNITED STATES PATENTS
2,740,487  4/1956  Murty et al. ................... 180/89 A
2,937,881  5/1960  Norrie ............................ 180/89 X
3,580,101  5/1971  Jorgensen et al. ........... 280/87 A X
2,798,568  7/1957  Zeller ............................. 74/493 X FOREIGN PATENTS OR APPLICATIONS
236,654  12/1961  Australia .................... 287/58 CT
872,549   7/1961  Great Britain ............... 287/53 SS Primary Examiner—Gerald M. Forlenza
Assistant Examiner—Frank E. Werner
Attorney—Craig, Antonelli, Stewart & Hill

[57]         ABSTRACT

A steering spindle for motor vehicles, particularly for trucks equipped with a spring-supported and preferably tiltable driver cab in which a part of the steering spindle is constructed two-partite to provide a linear compensation; this part of the steering spindle consists of a tubular member with a rod disposed within the same which are connected with each other by a multi-spline connection; roller bodies are arranged between the flanks of the multi-spline connection.

19 Claims, 3 Drawing Figures

PATENTED SEP 11 1973 3,757,885

INVENTORS
ADOLF STEINER
HANS RINNERGSCHWENTNER

BY Craig, Antonelli, Stewart & Hill

ATTORNEYS

STEERING SPINDLE FOR MOTOR VEHICLES, ESPECIALLY FOR COMMERCIAL-TYPE VEHICLES

The present invention relates to a steering spindle for motor vehicles, especially for trucks, with a spring-supported and preferably tiltable driver cab.

The present invention is concerned with the task to arrange the steering wheel in a motor vehicle together with the driver cab spring-supported without influencing the actuation of the steering wheel and the fine-feel of the steering. The steering spindle is to be so constructed that upon application of a torque in the steering installation, neither the spring system is impaired nor the application of the torque, i.e., the steering is obstructed by the spring system. The present invention essentially consists in that for the purpose of compensation in length, a section of the steering spindle is constructed two-partite and consists of a tubular member with a rod inserted into the same which are form-lockingly connected in the circumferential direction by a multi-spline connection, between the flanks of which are arranged anti-friction roller bodies. It is achieved by the particular construction of the multi-spline connection that only negligibly small frictional forces occur in the longitudinal direction of the steering spindle whereas the transmission of the torque is assured completely satisfactorily. If the driver cab is arranged to be tiltable, a greater compensation in length must be provided than is necessary for the spring movements of the driver cab. It is particularly advantageous in connection therewith if a sleeve provided with spline grooves is secured at the tubular member, into which engage the spline teeth of a sliding sleeve under interposition of the anti-friction roller bodies, which sliding sleeve is arranged on the rod and is connected therewith by a multi-spline connection. During inward spring movement of the driver cab, the longitudinal movement takes place in the multi-spline connection which is provided with roller bodies whereas the multi-spline connection between the sliding sleeve and the rod is utilized during the tilting of the driver cab during which, as expected, no steering torque has to be transmitted in the steering spindle. It is thereby structurally advantageous if the roller bodies surround the spline teeth of the sliding sleeve in the form of a flattened or elongated ring.

In order to achieve the entrainment of the sliding sleeve during the tilting of the driver cab, the sleeve secured at the tubular member may include an entrainment abutment for the sliding sleeve. In order to achieve that during the spring movements of the drive cab the movements take place only in the multi-spline connection equipped with roller bodies, a spring effective in the longitudinal direction of the steering spindle may be arranged between the sliding sleeve and the tubular member. This spring ensures that the sliding sleeve remains stationary in its normal position. It is thereby appropriate if the sliding sleeve abuts in its normal rest position at a preferably elastic abutment at the rod.

Accordingly, it is an object of the present invention to provide a steering spindle for motor vehicles, particularly commercial-type vehicles, which avoids by simple means the aforementioned shortcomings and drawbacks encountered in the prior art.

Another object of the present invention resides in a steering spindle for motor vehicles, particularly trucks, which permits a spring movement of the driver cab without impairing the actuation of the steering wheel or the fine feel of the steering system.

A further object of the present invention resides in a steering spindle construction of the type described above which permits only negligibly small frictional forces to occur in the longitudinal direction of the steering spindle during spring movement of the driver cab of the truck.

Still another object of the present invention resides in a steering spindle construction for trucks which not only permits spring movements of the driver cab but also permits tilting movements of the driver cab without requiring any disassemblies in the steering system.

These and further objects, features, and advantages of the present invention will become more obvious from the following description when taken in connection with the accompanying drawing which shows, for purposes of illustration only, one embodiment in accordance with the present invention, and wherein.

Figure 3:
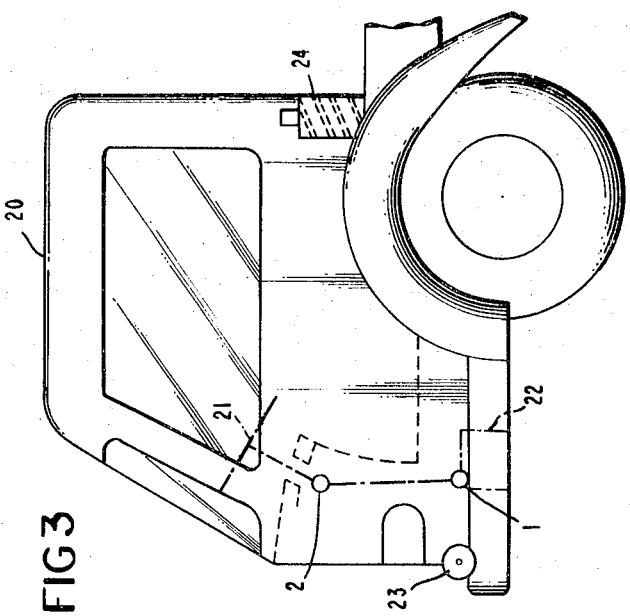
FIG. 3 is a schematic view showing the relative position of the steering spindle part in a commercial-type truck.
Figure 2:
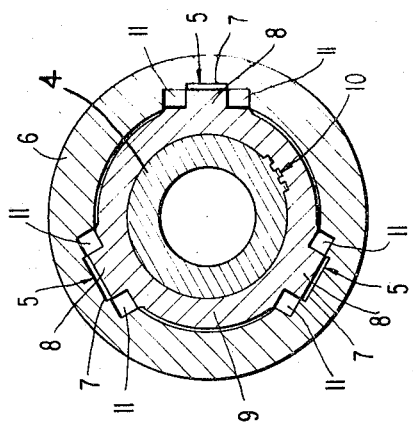
FIG. 2 is a transverse cross-sectional view, on an enlarged scale, taken along line II—II of FIG. 1.
Figure 1:
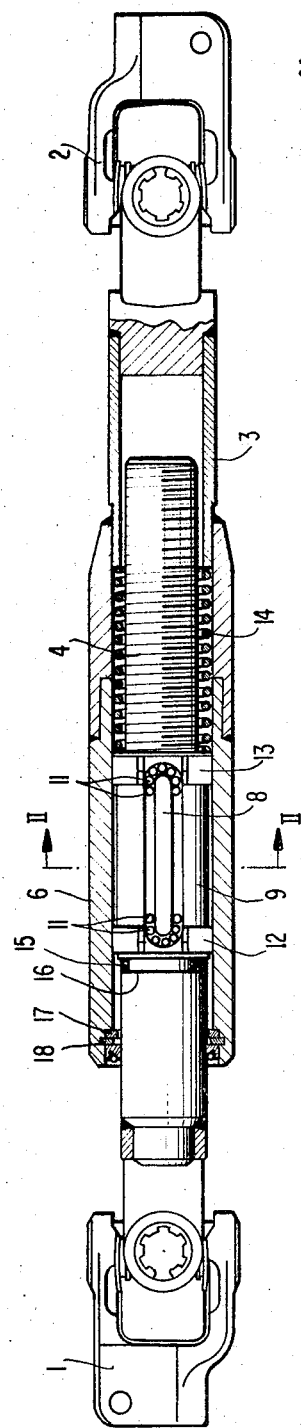
FIG. 1 is a longitudinal cross-sectional view through a part of a steering spindle constructed in accordance with the present invention.

Referring now to the drawing wherein like reference numerals are used throughout the two views to designate like parts, a section of a steering spindle for a commercial-type motor vehicle, particularly for a truck, is illustrated in the drawing which is arranged in the steering system between two universal joints 1 and 2. FIG. 3 schematically illustrates the positioning of the steering spindle section in conjunction with a truck cab 20. The lower universal joint 1 is thereby mounted directly in proximity to the steering gear 22 and makes it possible that the driver cab together with the steering system can be tilted. The upper universal joint 2 is located in proximity to the steering wheel 21 and permits an angular adjustment of the steering wheel by the driver. The illustrated section of the steering spindle is provided with a means for compensating for changes in length which makes it possible to arrange the part of the steering present in the driver cab together with the driver cab spring-supported and additionally to tilt the driver cab together with this part of the steering system in the forward direction. In FIG. 3, 23 schematically represents the cab tilting axis and 24 schematically represents a spring for mounting the cab to the frame.

The section of the steering spindle disposed between the two universal joints 1 and 2 consists of a tubular member 3 connected with the universal joint 2 and of a rod 4 inserted into the tubular member 3 and connected with the universal joint 1. In order to assure a safe and reliable transmission of the torque necessary for the steering, a multi-spline connection generally designated by reference numeral 5 is provided between the two parts 3 and 4. For that purpose a sleeve 6 is welded to the tubular member 3, which is provided inwardly thereof with spline grooves 7. The spline teeth 8 of a sliding sleeve 9 engage into the spline grooves 7 while the sliding sleeve 9 is connected with the rod 4 in the circumferential direction also be a multi-spline connection generally designated by reference numeral 10.

The multi-spline connection 5 between the rod 4 and the tubular member 3, i.e., between the sliding sleeve 9 and the sleeve 6 welded to the tubular member 3 is characterized by extraordinarily slight frictional forces during the displacement in the longitudinal direction of the steering spindle. For that purpose, anti-friction roller bodies 11 are provided between the flanks of the multi-spline connection 5—in the instant case, anti-friction rollers are arranged between the flanks of the multi-spline connection 5—which prevent a direct friction of the flanks. The roller bodies 11 are arranged in the form of an oval ring around the spline teeth 8 of the sliding sleeve 9, which ring is closed at the ends by additionally assembled rings 12 and 13. These rings 12 and 13 assume exclusively the function of the guidance of the sliding sleeve 9, whence they have a somewhat slightly larger diameter than the remaining part of the sliding sleeve 9, Additionally, a space results from this arrangement in an advantageous manner within the area of the roller bodies 11, within which may be accommodated a long-lasting or permanent lubricant for the roller bodies 11. The sliding sleeve 9 is retained in the illustrated normal position by a spring 14 acting in the longitudinal direction of the steering spindle and arranged between the sliding sleeve 9 and the tubular member 3. The sliding sleeve 9 thereby abuts against an abutment made from elastic material at a collar 16 of the rod 4.

In the normal position, i.e., when the driver cab is not tilted, the length compensation for the spring-supported driver cab between the universal joints 1 and 2 takes place exclusively by the multi-spline connection 5 which is equipped with roller bodies 11, between the sliding sleeve 9 and the sleeve 6 secured at the tubular member 3. As a result of the very slight frictional forces, it is achieved that a torque applied to the steering wheel does not influence the spring system while similarly, the spring system cannot influence the application of a torque. It is made possible thereby to provide a driver cab spring system having a low frequency.

During the tilting of the driver cab, during which a considerably larger compensation in length is necessary, the latter takes place essentially in that the sliding sleeve 9 itself can be displaced on the rod 4. The sliding sleeve 9 is thereby taken along by an entraining abutment 17 of the sleeve 6 secured at the tubular member 3, which is retained by a ring consisting of a snap ring 18.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A steering spindle for motor vehicles characterized in that a section of the steering spindle is constructed two-partite to provide for a compensation in length and includes a tubular member with a rod disposed therewithin, and multi-spline connecting means connecting said tubular member with said rod in the circumferential direction including roller body means arranged between the flanks of the multi-spline connection, and in that a sleeve provided with spline groove means is secured at the tubular member, a sliding sleeve provided with spline teeth means engaging into the spline groove means under interposition of the roller body means, said sliding sleeve being arranged on said rod and being connected therewith by a further multi-spline connection.

2. A steering spindle according to claim 1, characterized in that the motor vehicle is a truck provided with a spring-supported driver cab.

3. A steering spindle according to claim 2, characterized in that said driver cab is tiltable.

4. A steering spindle according to claim 1, characterized in that the roller body means surround spline teeth means of the sliding sleeve in the form of an elongated ring.

5. A steering spindle according to claim 4, characterized in that the sleeve secured at the tubular member includes an entraining abutment means for the sliding sleeve.

6. A steering spindle according to claim 5, characterized in that a spring means acting in the longitudinal direction is arranged between the sliding sleeve and the tubular member.

7. A steering spindle according to claim 6, characterized in that the sliding sleeve abuts in its normal position at an abutment provided at said rod.

8. A steering spindle according to claim 7, characterized in that said last-mentioned abutment is elastic.

9. A steering spindle according to claim 8, characterized in that the motor vehicle is a truck provided with a spring-supported driver cab.

10. A steering spindle according to claim 9, characterized in that said driver cab is tiltable.

11. A steering spindle according to claim 1, characterized in that the sleeve secured at the tubular member includes an entraining abutment means for the sliding sleeve.

12. A steering spindle according to claim 1, characterized in that a spring means acting in the longitudinal direction is arranged between the sliding sleeve and the tubular member.

13. A steering spindle according to claim 1, characterized in that the sliding sleeve abuts in its normal position at an abutment provided at said rod.

14. A steering spindle according to claim 13, characterized in that said last-mentioned abutment is elastic.

15. An adjustable length steering spindle section for motor vehicles comprising: a tubular member, a rod disposed within said tubular member, multi-spline connecting means connecting said tubular member to said rod, said multi-spline connecting means including a plurality of flank means for guiding relative longitudinal movement of said tubular member with respect to said rod and for preventing relative rotation of said tubular member and said rod, and roller body means arranged between at least some of the respective flank means for reducing the frictional resistance to the relative longitudinal movement between said tubular member and said rod, wherein a first sleeve is secured to said tubular member and a second sleeve is connected to said rod, and wherein said flank means are formed by longitudinally extending grooves on the inside of said first sleeve and corresponding longitduinally extending splines on the exterior surface of said second sleeve, and wherein said second sleeve is slidably connected to said rod by way of further multi-spline connecting means.

16. An adjustable length steering spindle section for motor vehicles comprising: a tubular member, a rod disposed within said tubular member, multi-spline connecting means connecting said tubular member to said rod, said multi-spline connecting means including a plurality of flank means for guiding relative longitduinal movement of said tubular member with respect to said rod and for preventing relative rotation of said tubular member and said rod, and roller body means arranged between at least some of the respective flank means for reducing the frictional resistance to the relative longitudinal movement between said tubular member and said rod, wherein said flank means includes a first set of interdigitated spline and groove means connecting a portion of said tubular member to an intermediate member and a second set of interdigitated spline and groove means connecting said intermediate member to said rod, and wherein said roller body means are arranged at only one of said first and second sets such that the sliding friction between the intermediate member and the one of said tubular member and said rod associated with the roller body means is substantially less than the sliding friction between the intermediate member and the other of said tubular member and said rod.

17. An arrangement according to claim 16, wherein said roller body means are arranged at said first set.

18. An arrangement according to claim 17, wherein said tubular member includes an entraining abutment for entraining the intermediate member upon a predetermined relative movement between said tubular member and said intermediate member.

19. An arrangement according to claim 16, further comprising a spring means acting in the longitudinal direction and arranged between the intermediate member and the tubular member.

* * * * *